April 9, 1929 V. MULHOLLAND Re. 17,263

METHOD AND APPARATUS FOR ANNEALING GLASSWARE

Original Filed March 31, 1925 7 Sheets-Sheet 1

Inventor:
Vergil Mulholland
by Robson D. Brown
Atty.

April 9, 1929. V. MULHOLLAND Re. 17,263
METHOD AND APPARATUS FOR ANNEALING GLASSWARE
Original Filed March 31, 1925 7 Sheets-Sheet 2
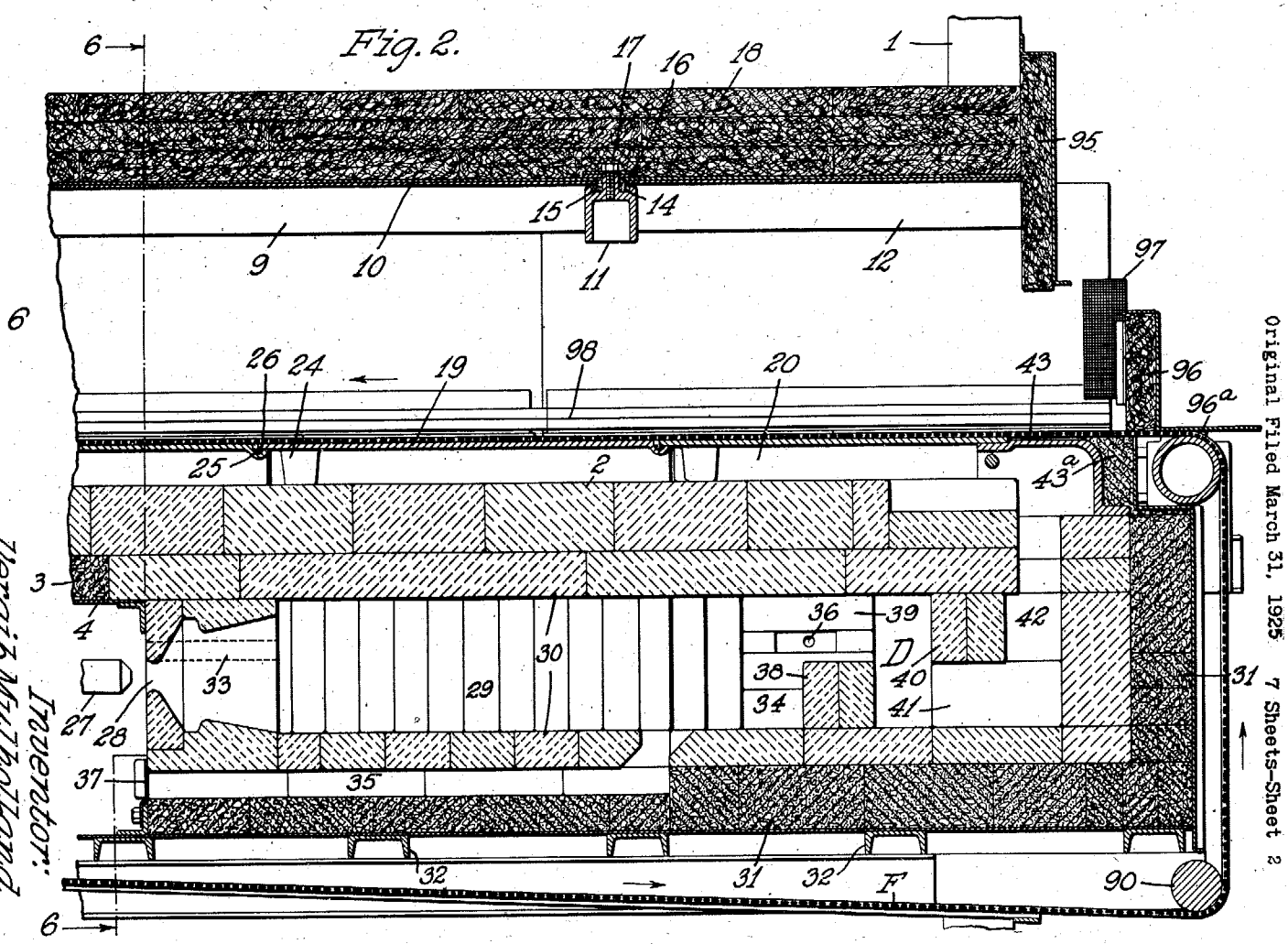

V. MULHOLLAND

April 9, 1929. METHOD AND APPARATUS FOR ANNEALING GLASSWARE Re. 17,263

Original Filed March 31, 1925 7 Sheets-Sheet 3

Inventor:
Vergil Mulholland
by Robson D. Brown
Atty.

April 9, 1929. V. MULHOLLAND Re. 17,263

METHOD AND APPARATUS FOR ANNEALING GLASSWARE

Original Filed March 31, 1925 7 Sheets-Sheet 4

Inventor:
Vergil Mulholland
by Robson B. Brown
Atty.

April 9, 1929. V. MULHOLLAND Re. 17,263

METHOD AND APPARATUS FOR ANNEALING GLASSWARE

Original Filed March 31, 1925 7 Sheets-Sheet 5

Inventor:
Vergil Mulholland
by Robson & Brown
Atty.

April 9, 1929. V. MULHOLLAND Re. 17,263

METHOD AND APPARATUS FOR ANNEALING GLASSWARE

Original Filed March 31, 1925. 7 Sheets-Sheet 6

Inventor:
Vergil Mulholland
by Colson & Brown
Atty.

April 9, 1929. V. MULHOLLAND Re. 17,263

METHOD AND APPARATUS FOR ANNEALING GLASSWARE

Original Filed March 31, 1925 7 Sheets-Sheet 7

Inventor:
Vergil Mulholland
by Robson D. Brown
Atty.

Reissued Apr. 9, 1929. Re. 17,263

UNITED STATES PATENT OFFICE.

VERGIL MULHOLLAND, OF WEST HARTFORD, CONNECTICUT, ASSIGNOR TO HARTFORD-EMPIRE COMPANY, OF HARTFORD, CONNECTICUT, A CORPORATION OF DELAWARE.

METHOD AND APPARATUS FOR ANNEALING GLASSWARE.

Original No. 1,571,137, dated January 26, 1926, Serial No. 19,615, filed March 31, 1925. Application for reissue filed July 26, 1928. Serial No. 295,590.

This invention relates to a method of and apparatus for annealing glassware and particularly for annealing a continuous succession of articles delivered from a ware-shaping machine. More specifically, it relates to the annealing of glassware in a lehr of the tunnel type in which the ware passes in procession through a tunnel whose temperature varies from end to end.

Glassware, after being shaped in a mold, is ordinarily removed therefrom while still very hot and is annealed by gradually cooling it to atmospheric temperature. If merely set out in the open air it will cool too rapidly and unevenly. Its outer surface will cool and contract more rapidly than its interior portions, thus altering the relative dimensions and locations of different portions of the piece and creating stresses therein, which tend to disrupt it. To avoid or minimize these stresses is the object of annealing. If not sufficiently or properly annealed, so that undue internal stresses still exist therein, the article breaks easily when used or handled, and may even fly into small pieces spontaneously.

In annealing glassware commercially, it is customary to pass the ware, disposed in several longitudinal rows side by side on a metallic conveyor, through a passage or tunnel heated to a low red heat at the entrance end for 20% or 25% of its length and having a gradually decreasing temperature toward the discharge end where it approaches atmospheric temperature. Such an apparatus is known as a "tunnel lehr." In the usual practice of annealing with such tunnel lehrs, the first step is an attempt at equalizing the temperature in each article by reheating it to approximately a low red heat, or at least to a condition sufficiently plastic to release any stresses existing therein. After this the article is gradually cooled as it passes through the tunnel.

In the construction of the usual lehrs above described, the ware is carried through the tunnel on a conveyor, which may be composed of a series of slats or pans carried by chains. Whatever the construction of this conveyor, it is of necessity spaced from the floor of the tunnel, and the space between the conveyor and the floor forms, in effect, a flue through which air currents pass in one direction or the other and in which convection currents are continually in circulation.

No attempt has been made to control or regulate the air currents set up in the lehr below the conveyor and above the floor, and as the lehrs are usually horizontal, the longitudinal flow of air through this flue, formed below the conveyor, has been subject to constant variations during the operation of the lehr, depending upon outside circumstances, such as the direction of the wind.

The horizontal position of the lehr has caused the same result in the air currents in the space above the conveyor, that is, at one time there may be an out-draft at the receiving end of the lehr and at another time there may be an in-draft, making a uniform treatment of the ware impossible. Thus, it is apparent that the structures heretofore employed have of necessity produced uncontrollable air currents at uncontrolled temperatures, which prevented uniformity in the continued operation of the lehr, and made it impossible to subject the articles in a single transverse row across the conveyor to the same heat conditions.

Such lehrs require a large amount of fuel. Moreover, the annealing done by them is frequently more or less uncertain and incomplete, due not only to inadequate control of the initial heating and the rate of subsequent cooling of the ware, but also to considerable differences in temperature between different points in the same transverse section or zone of the tunnel. This causes or permits too wide a difference in temperature between different portions of the same article and between different articles of the same transverse row as the articles advance through the lehr. Under these conditions, an extremely slow rate of cooling is employed in an attempt to anneal the particular articles under the most adverse heat conditions. Even with this slow rate of cooling these conditions tend toward faulty annealing of the ware.

Various methods and apparatus have been provided for the purpose of maintaining all parts of each article and all of the ware in each transverse row in the lehr, at approximately the same temperature while cooling. If there is any substantial difference in temperature in different parts of the same article, it will not be properly annealed and if one article in a transverse row varies greatly in temperature from another article, one or the other of the articles will not be properly annealed unless the temperature changes are made at such a slow rate as to accommodate the article at the abnormal temperature.

If all portions of a glass article, which is being annealed, are brought to a uniform annealing temperature, and are held at this temperature a sufficient time to permit the release of strains, and if the subsequent cooling be kept uniform as to all portions of the article, it can be cooled and annealed perfectly, which result is not possible in the usual commercial lehr. This is an ideal condition for annealing and permits the article to be annealed and cooled in a minimum time, as for instance, with certain kinds of ware, in less than one hour as compared with two and one-half to five hours in the old-style lehr. The nearer such ideal conditions can be approached in a tunnel lehr, the more efficient and better will be its annealing.

A more complete discussion of the above-mentioned factors will be found in my copending application for Letters Patent, Serial No. 661,827, filed Sept. 10, 1923, on many features of which the present application constitutes an improvement.

The general objects of the present invention are to produce better annealing of glassware, to save as much fuel as possible in the annealing, and to reduce the time of annealing, as well as to overcome or minimize various disadvantages of existing tunnel lehrs.

More specifically, the object is to create a proper environment through which the glassware may be moved continuously on a conveyor and in which it may be subjected, as nearly as possible, to the ideal cooling conditions to produce the best possible annealing and to reduce the time and cost of the operation.

Another object is to provide improved means and methods for controlling the temperature throughout the length of a lehr tunnel so as to produce as near the ideal environment for the ware as possible.

Another object of the invention is to overcome the uncontrolled air currents which, as previously mentioned, have heretofore existed both above and below the conveyor. This object is accomplished by arranging the lehr at a slight inclination which induces a draft of air toward the higher, hot end, thus preventing any air currents from flowing in the opposite direction and securing control of such convection currents as may exist. In order to prevent air currents from flowing below the conveyor, the present lehr provides a conveyor in direct contact with the lehr floor on one side and the ware on the other.

Another object is to control the local convection currents within the tunnel and utilize them in producing the desired thermal environment for the ware and in producing as nearly a uniform temperature as possible throughout any article or transverse row of articles.

Another object is to provide a lehr tunnel composed of standard sections which may be placed end to end to any desired length. More specific objects are to provide various structural features to be pointed out below.

In carrying out the foregoing objects, I provide a lehr having a plurality of lower flues extending longitudinally beneath the tunnel and a plurality of upper flues extending longitudinally above the tunnel, all of said flues being provided with damper-controlled openings arranged at spaced intervals throughout their length and communicating with the outside atmosphere.

Heated gases are passed through the lower flues from the receiving end of the lehr toward the delivery end thereof, and the temperature of the gases, and therefore the temperature of the floor of the tunnel throughout its length, is controlled at will by adjusting the dampers in these flues to dilute the gases with air at selected intervals.

Cooling air is passed through the upper flues in a direction opposite to that of the flow of the heated gases, and the cooling effect of the air is also regulated to control the temperature of the top of the tunnel throughout its length by adjusting the dampers in these flues to permit more or less of the air to escape to the outside atmosphere at selected intervals.

By properly adjusting the dampers in both the upper and lower flues, the temperatures at the bottom and at the top of the tunnel may be independently regulated so as to control the circulation of local heat-convection currents in the tunnel thereby rendering it possible to distribute the heat uniformly both vertically and transversely of the tunnel.

Ware is carried through the tunnel by an endless conveyor, preferably composed of flexible woven wire fabric, the ware-bearing strand of which rests directly upon the flat floor of the tunnel. By reason of the light weight and open construction of the conveyor, it has low heat capacity and relatively great surface area in proportion to its mass, and therefore follows very closely the temperature of its environment.

The roof or upper wall of the tunnel is constructed of metallic sheets provided with a plurality of parallel, longitudinally-extending corrugations substantially V shape in cross-section. These corrugations provide the cooling flues, mentioned above, for conducting cooling air adjacent to the top of the tunnel, and they also provide a top of relatively great heat-radiating surface in comparison with the width of the tunnel.

The angularity of the sides of the corrugations is such as to disperse transversely the radiated heat reflected from their surfaces and also to produce a transversely distributed effect in absorbing radiated heat. In this way they tend to produce a uniform distribution of heat throughout any transverse zone of the tunnel.

These features, as well as additional features of novelty to be hereinafter pointed out, will be best understood from the following description, together with the accompanying drawings, in which:

Fig. 2 is a vertical longitudinal section through the receiving end of the tunnel and the fire box, taken on the line 2—2 of Fig. 6;

Figure 1:
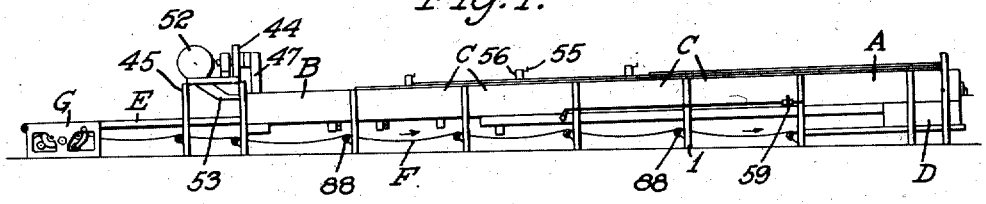
Figure 1 is a diagrammatic side view of a lehr constructed in accordance with my invention.

The present lehr comprises in general, as indicated in Fig. 1, an entrance or receiving section A; an exit or delivery section B; a plurality of intermediate sections C, of any desired number; a fire box D, located beneath the receiving section A; a delivery table or platform E located at the exit end of the tunnel; an endless belt conveyor F, the ware-bearing strand of which traverses the tunnel and the table E, and the idle strand of which returns to the receiving or hot end of the tunnel beneath the lehr; and a conveyor-driving mechanism G.

Figure 3:
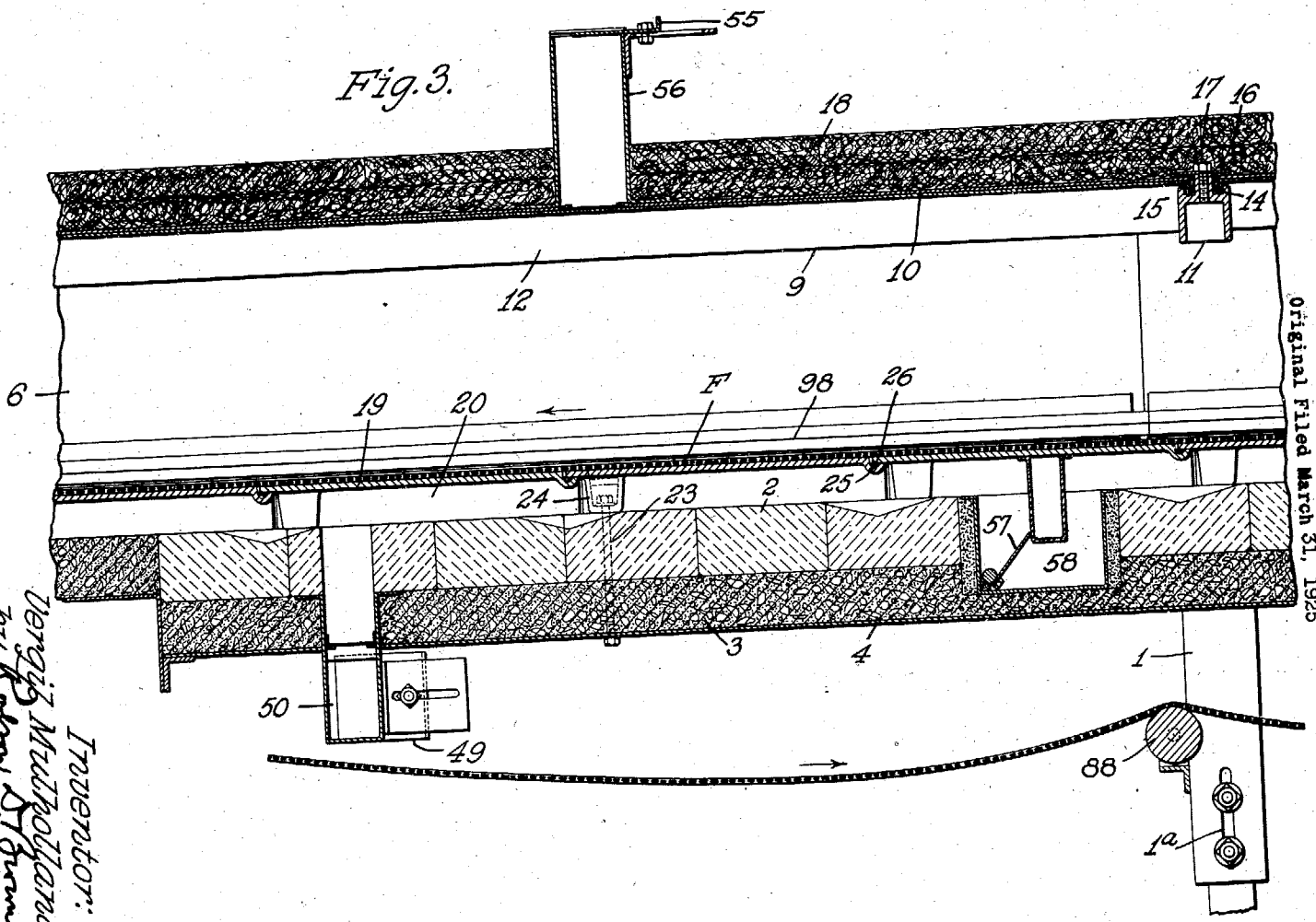
Fig. 3 is a similar view through a succeeding section of the lehr.

The several sections of the lehr are supported in end-to-end relation to form a tunnel, by suitable frame-work 1, which may be adjusted vertically, as by the bolt-and-slot construction 1[a] shown in Fig. 3. The tunnel is slightly inclined downwardly from the hot or receiving end to the cool or delivery end to cause a tendency for air to flow through the tunnel, in an opposite direction to the ware movement that is barely sufficient to prevent an inflow of cold air at the hot end of the tunnel without necessarily exerting a material cooling influence upon the ware. Such a cooling influence by a longitudinal current of air may be employed to a slight extent, if desired, provided the longitudinal current is sufficiently broken up by local transverse convection currents to prevent an injurious effect from stratification of air at different temperatures. In this way, the local convection currents moving transverse to the longitudinal current will permit the cooling effect of the longitudinal current and still tend to produce a uniform temperature throughout any transverse zone of the tunnel. The bottom wall of the receiving section A, and several of the succeeding intermediate sections C, may be constructed as shown in Figs. 2 and 3, of heat insulating brick 2 laid on a bed of heat-insulating cement 3. The cement bed 3 is, in turn, supported by a bed plate 4 and side channel bars 5 (Fig. 6) which latter constitute a part of the frame-work 1.

The side walls of the sections A and C of the lehr each comprise spaced inner and outer parallel sheet metal plates 6 and 7 respectively (Fig. 6) which provide a housing for insulating material 8, such as powdered kieselguhr or mineral wool. Outer plates 7 at each side of the lehr are rigidly secured together, but the inner plates 6, which are subject to the heat of the tunnel, overlap each other for sliding movement to permit their longitudinal expansion without buckling, and may be provided with bright heat-reflecting inner surfaces. The thin sheet-metal plates 6 may be quickly heated up to their working temperature with a minimum amount of heat, since their heat capacity is very low. The insulation 8 outside of these plates reduces the dissipation of heat to the outside, so that only a minimum amount of heat is required to maintain the lehr tunnel at the desired temperature. The bright inner surfaces of the plates 6 reflect the heat radiated from the ware and thus assist in maintaining a uniform temperature throughout any transverse row of ware.

Figure 6:
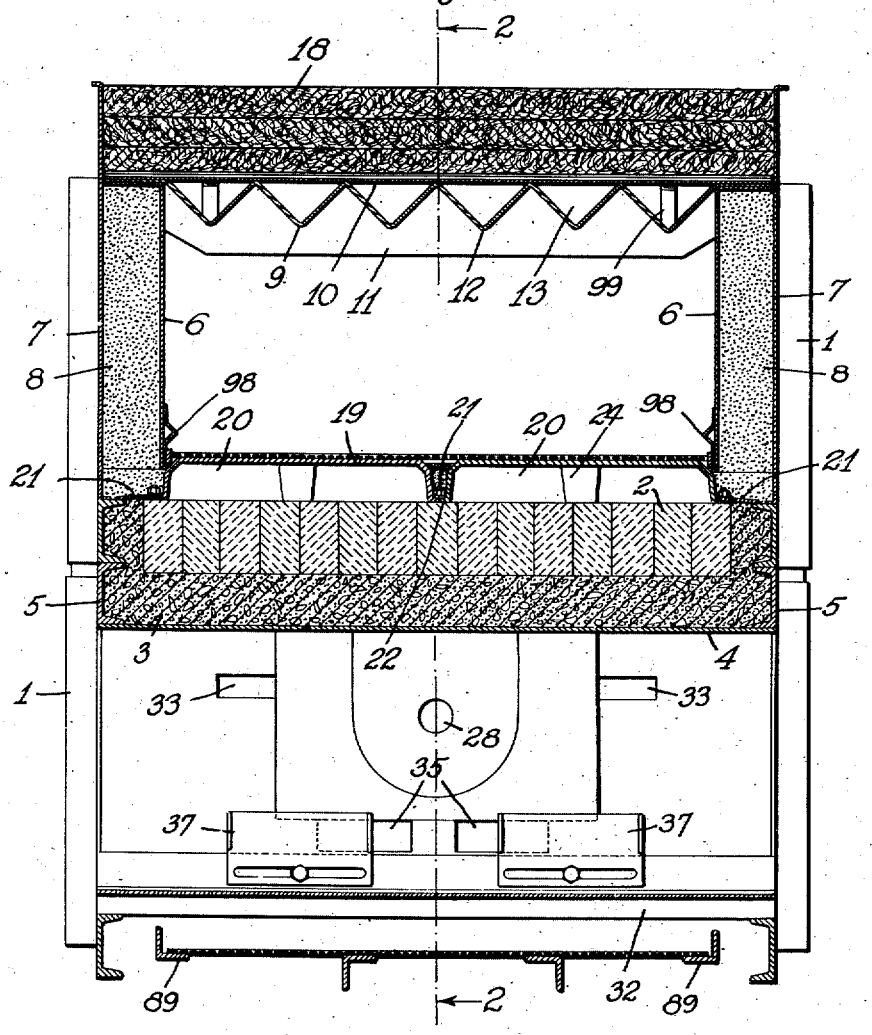
Fig. 6 is a vertical transverse section taken on line 6—6 of Fig. 2.
Figure 11:
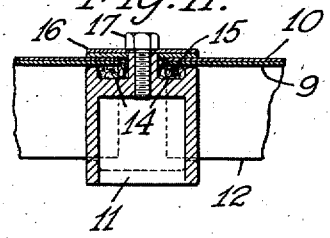
Fig. 11 is a vertical transverse section through one of the supports for the top of the lehr, showing the expansion joint between the metallic plates which form the roof of the tunnel.
Figure 7:
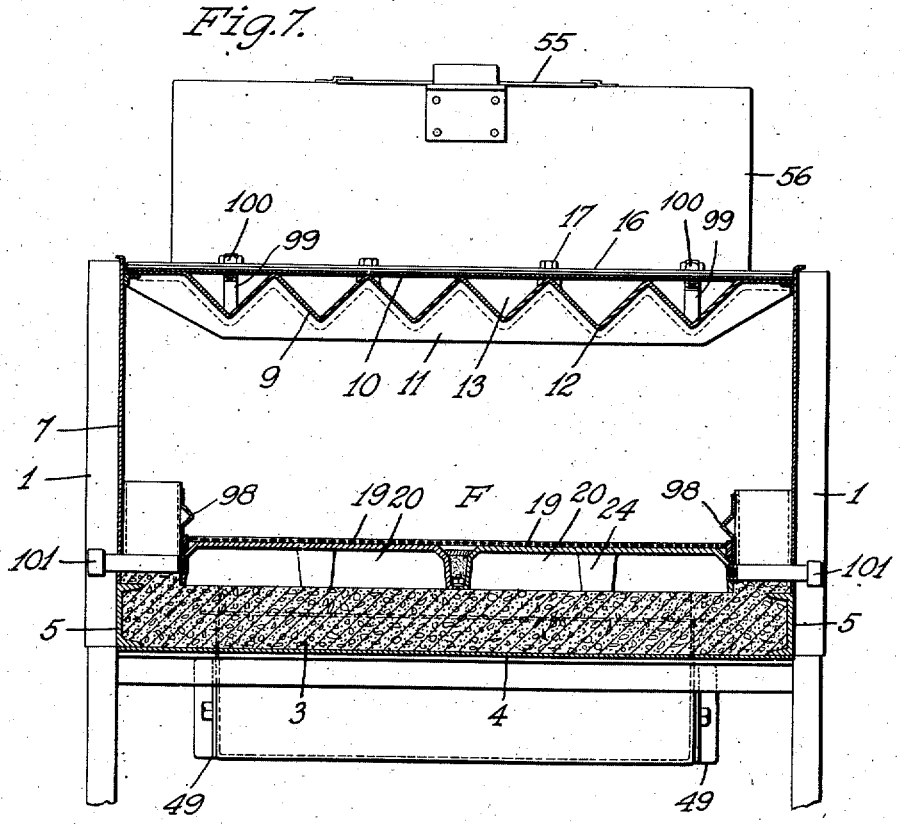
Fig. 7 is a similar view through the delivery end of the lehr.
Figure 8:
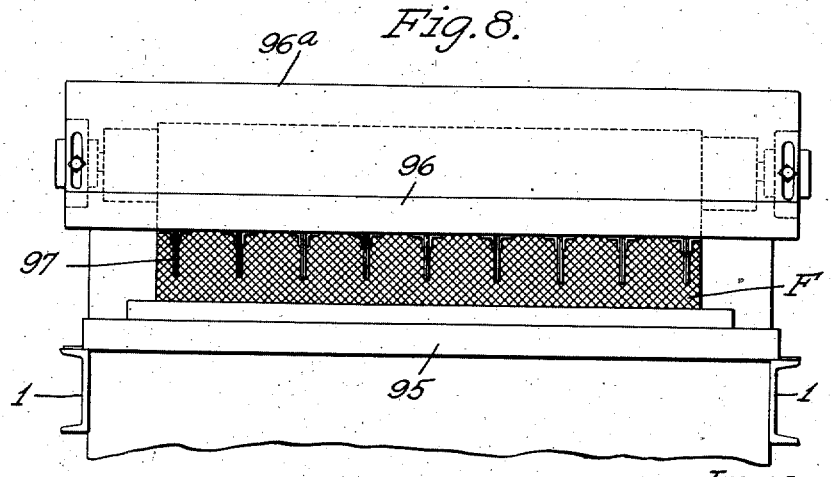
Fig. 8 is a fragmentary plan view of the receiving end of the lehr, illustrating the ware-spacing device for the conveyor.

The top of the lehr comprises inner and outer sheet-metal plates 9 and 10 respectively, which are supported at their front and rear edges in end-to-end relation, longitudinally of the lehr, by transverse metallic beams or girders 11 carried by the frame-work 1 (Fig. 7). The inner plates 9 are provided with a plurality of longitudinally extending V-shaped corrugations 12 which, together with the outer plates 10, form a plurality of longitudinal and parallel cooling flues 13, which project into the tunnel space, as best shown in Figs. 6 and 7. The upper bends or corrugations of the plates 9 may, if desired, be slightly spaced below the upper plates 10, so as to permit an exchange of air between the several cooling flues, which tends to equalize the pressure and temperature therein. In addition, the corrugations provide a roof for the tunnel having a relatively large heat-absorbing surface in comparison to the width of the tunnel. The angularity of the sides of the corrugations 12 is such as to reflect the radiated heat downwardly at an angle to the vertical and to absorb heat radiated from points to one side of the vertical, thereby tending to equalize the temperature transversely of the tunnel. The beams 11 are formed with a series of V-shaped depressions to accommodate the corrugations 12 and provide seats therefor. The upper surfaces of the beams 11 are also formed, as best shown in Fig. 11, with parallel channels 14 adapted to contain an insulating packing 15 upon which the edges of the plates 9 and 10 are secured for a limited degree of sliding movement by metallic strips 16 and bolts 17 threaded into the beams 11. Sufficient clearance is provided between the opposed edges of the plates 9 and 10 to permit their longitudinal expansion when heated.

The top of the lehr above the heated end and above several of the succeeding sections is insulated, to retard the cooling of the ware, by several layers of fibrous insulating material in the form of superposed slabs 18, the number of layers of which is reduced toward the cold end of the lehr. The side walls and top of the delivery section B of the lehr are not insulated, as at this point it is desired to accelerate the dissipation of heat from the ware as much as is possible.

Within the lehr and supported by the refractory bottom 2 are a plurality of inverted channel members 19, which are preferably constructed of cast iron, and are arranged in end-to-end relation in pairs longitudinally of the tunnel. These members form the floor of the tunnel and provide two parallel longitudinal heating flues 20. The channel members 19 are maintained against displacement by clips 21 which engage lips 22 formed in the sides of the members, and by bolts 23 (Figs. 3 and 5) which extend through bosses 24 provided near the central portion of one end of each of the members 19. The bosses 24 also act as additional supports for the bottom of the tunnel and assist in preventing the "working" thereof.

For the purpose of providing expansion joints between the members 19, the top edge of the fixed end of each of these members overlaps a channel 25 (Fig. 2) which is formed in the adjacent edge of the next succeeding member and which is filled with a gas-tight packing 26. Sufficient clearance is allowed between the opposed edges of the members 19 to permit their longitudinal expansion when heated. Since the members 19 are anchored to the bottom of the lehr at one of their ends only, they are free to expand toward the opposite end without warping or buckling.

The lehr is heated by a burner 27 (Fig. 2) which projects a flame forwardly through an opening 28 into a combustion chamber 29 provided in the fire box D. This chamber is provided with an inner lining 30 of refractory material and with an outer covering 31 of heat-insulating brick supported by transverse channel bars 32 secured to the frame 1 of the lehr.

Figure 5:
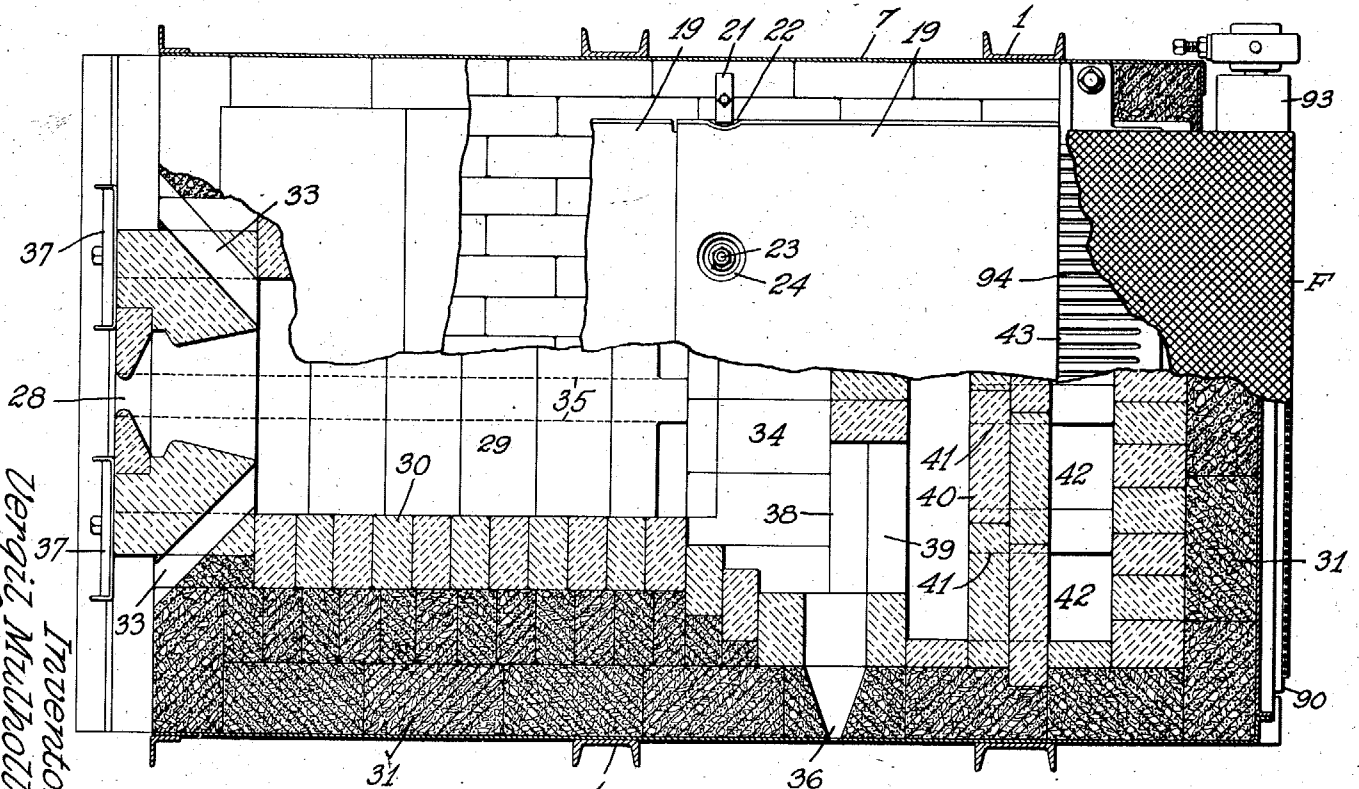
Fig. 5 is a horizontal step section through the entrance end of the tunnel and the fire box.

The character of the combustion in the chamber 29 may be observed through two ports 33 disposed one on each side of the burner inlet 28, as best shown in Fig. 5. As the products of combustion from the burner pass forwardly, they enter a relatively wide portion 34 of the chamber 29, where they are diluted, to lower their temperature, by air from the outside atmosphere which is admitted through two parallel ducts 35 provided in the bottom of the chamber. Observation ports 36 are also provided in the side walls of the chamber 34. The amount of diluting air that is admitted to the chamber 34 through the ducts 35 is regulated at will by dampers 37 which may be manipulated, if necessary, to admit more or less air to one side or to the other of the chamber, thus distributing the heat equally transversely of the chamber.

As the products of combustion pass forwardly they encounter a baffle 38 (Figs. 2 and 5) provided on the bottom of the chamber 34, over which they pass through spaced ports 39. As the products of combustion emerge from the ports 39 they encounter a second baffle 40 depending from the top of the chamber, which deflects them downwardly, and beneath which they pass through ports 41. The products of combustion are thoroughly intermingled and the temperature thereof is evenly distributed transversely of the lehr as they emerge from the ports 41 by reason of their tortuous passage from the combustion chamber 29. The heated gases in this condition then rise through spaced vertical flues 42 and encounter an angle plate 43 which forms a continuation of the metallic bottom of the tunnel and which deflects the heated gases rearwardly into the heating flues 20, beneath the lehr tunnel. The construction of the fire box D and its arrangement beneath the receiving end of the lehr not only insures that the products of combustion are thoroughly mixed before they are admitted to the heating flue 20, but reduces the size of the lehr, and permits easy access to the entrance of the tunnel and to the conveyor.

Figure 4:
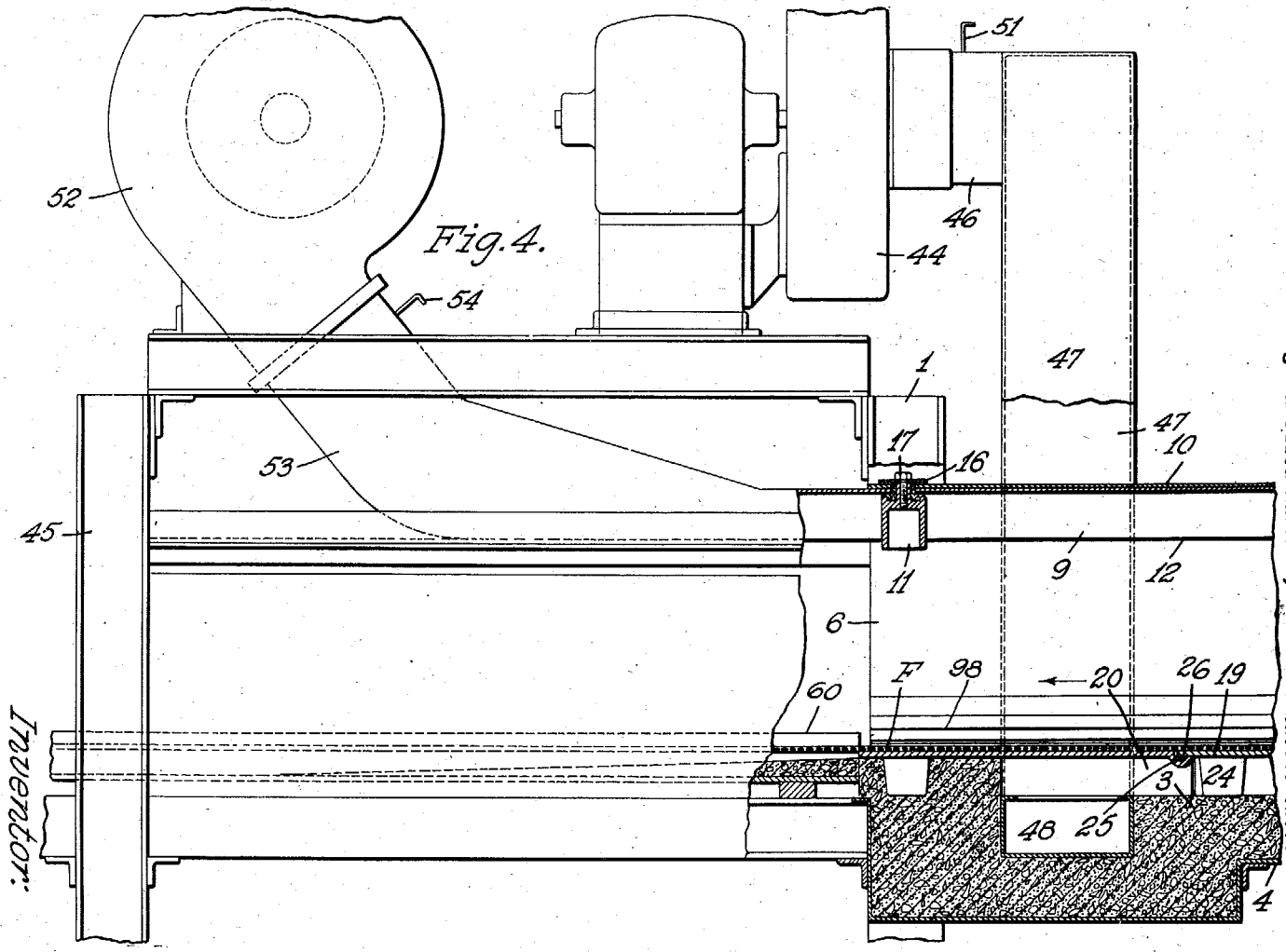
Fig. 4 is a view partly in side elevation and partly in vertical section of the exit end of the lehr.

The heated gases are drawn through the flues 20 by a motor-driven exhaust fan 44, shown in Figs. 1 and 4, which is mounted on an overhead frame structure 45. This fan communicates, through a pipe 46, with a pair of vertical flues 47, disposed one on each side of the lehr and communicating at their lower ends, through a transverse duct 48, with both of the flues 20.

The temperatures in the flues 20 are regulated by the admission of regulated amounts of air from the outer atmosphere as suitably spaced points lengthwise of these flues. Such admission of air is controlled by means of dampers 49 provided at openings 50 which are located at intervals along the flues 20 and which communicate with the outside atmosphere. One of these openings, with its damper arrangement, is shown in Fig. 3, and others are indicated in Fig. 1. A damper 51 is also provided in the pipe 46 to regulate the draft produced by the fan 44.

Cooling air is forced through the flues 13 in the top of the lehr tunnel, in a direction opposite to that of the flow of the heating gases in the flues 20, by means of a fan 52 shown in Figs. 1 and 4. This fan is mounted on the blower-supporting frame 45 and communicates with all of the flues 13 through a common flue or conduit 53 provided with a damper 54.

The temperature gradient or curve in the portions of the cooling flues 13 adjacent to the cooling zone of the tunnel, that is to say, the rate and degree of variations in temperature longitudinally of these flues, may be also regulated by dampers 55 provided in spaced stacks 56 (Figs. 1 and 3) which communicate with the outside atmosphere through the top of the lehr.

By properly adjusting both the dampers 49 and 55 in the heating flues 20 and the cooling flue 13 respectively, the desired temperature gradients may be obtained in these flues and the portions of the tunnel adjacent thereto. That is to say, the character of the temperature curves obtained by plotting temperatures as ordinates against distance along the lehr as abscissæ, in both the heating flue and in the cooling flue is determined by the number of the damper-controlled openings, by the amount that the dampers are opened to the outside atmosphere, and also by the location of the dampers. For example, the less the amount of cooling air from the outer atmosphere that is permitted to enter the forward or hotter portions of the heating flues 20, the greater distance will the heat in these flues influence the temperatures therein; and the less the amount of cooling air that is allowed to escape from the rear or cooler ends of the cooling flues 13, the greater distance will the cooling air traverse these flues. It therefore follows that by regulating the amount that the gases in the heating flues are diluted and cooled by outside air, and by regulating the amount of cooling air escaping through the stacks from the cooling flues 13 and by also determining the location of the dampers that are adjusted, the resultant temperature gradients of the top and bottom portions of the tunnel may not only be controlled at will, but the point or zone of maximum drop in the temperature curves may be shifted longitudinally of the tunnel.

By thus heating the floor of the tunnel to cause upwardly moving convection currents and by cooling the top of the tunnel to cause downwardly moving convection currents and by independently regulating the degree of heating and cooling, the rate of movement of the convection currents in the tunnel may be controlled at will, thereby rendering it possible to obtain a substantially uniform temperature, so far as its effect upon the ware is concerned, in a vertical direction in any transverse section or zone in the tunnel.

The draft in the combustion chamber may be controlled independently of the damper 51 by a damper 57 which, as shown in Fig. 3, is provided in a transverse U-shaped duct 58 which is formed in the bottom of the lehr and which establishes communication between the parallel heating flues 20. This damper, for convenience, is operated by means of a suitable screw-threaded rod provided with a hand wheel 59 (Fig. 1) that is located at a point adjacent to the fire box D, thus permitting the operator to regulate the draft in the combustion chamber at the same time that he is regulating and observing the character of the flame delivered by the burner.

The receiving table E consists of a plurality of spaced parallel longitudinal bars or rails 60 (Figs. 1, 4 and 10) which are supported at their forward ends by the frame of the delivery section B of the lehr, and at their rear ends by a frame 61 of the belt driving mechanism G. This table provides a support for the conveyor as it emerges from the tunnel bearing the annealed ware, and is of sufficient length to permit several persons to stand side by side on each side of the table to inspect and remove the ware from the conveyor for packing. The conveyor F and the table E are sufficiently narrow to permit easy access, from either side of the table, to ware located in the central portion of the conveyor.

The conveyor F is an endless belt of flexible open structure, the ware-bearing strand of which lies flat upon the cast iron inverted channel members 19, which constitute the bottom of the lehr tunnel, and upon the rails 60 of the receiving table E. I prefer that the conveyor belt be composed of woven wire fabric, as the relatively small amount of metal employed in a conveyor of such type, together with its openwork structure, insures a low heat capacity, a large heat-radiating surface area in comparison with its mass, maximum radiation of heat through the openings in the conveyor, and minimum contact with both the bottom of the tunnel and with the ware.

Figure 9:
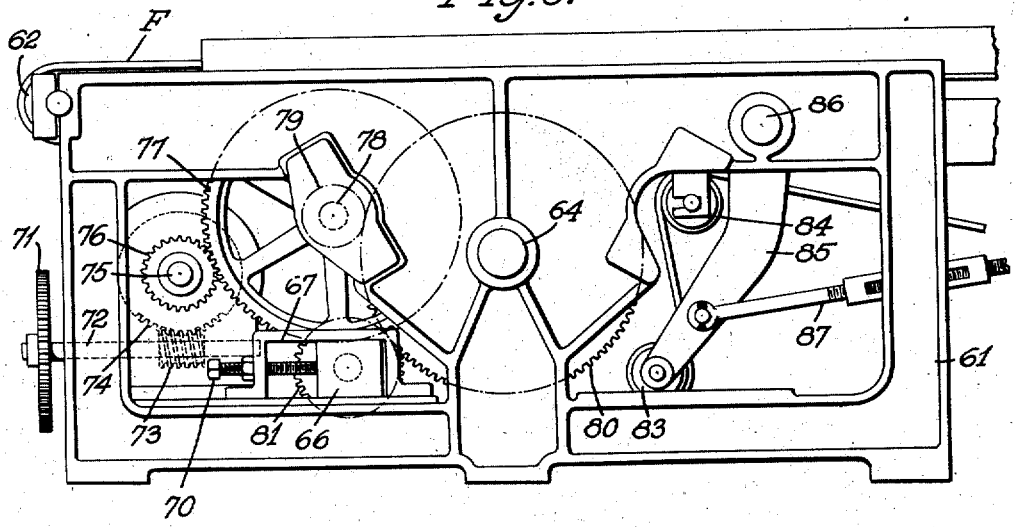
Fig. 9 is a side elevation of the conveyor driving mechanism.
Figure 10:
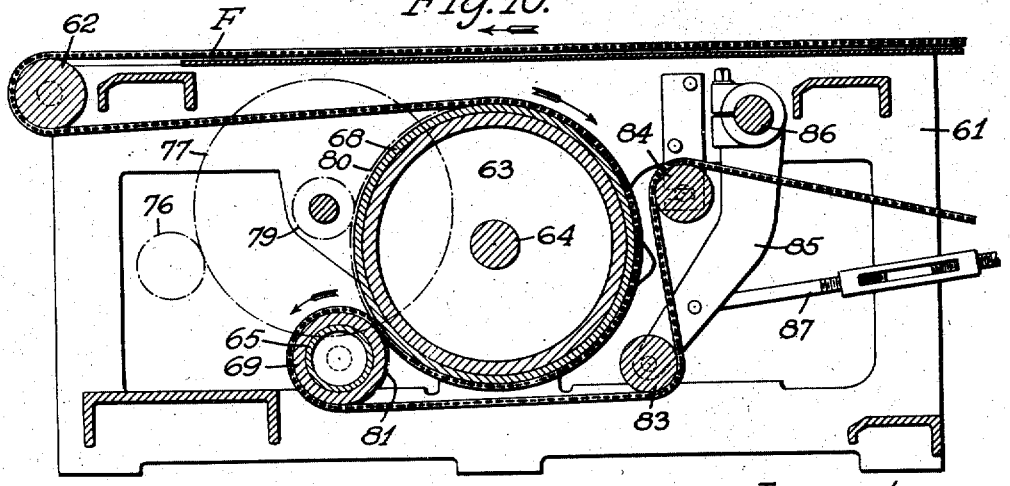
Fig. 10 is a vertical longitudinal section through the mechanism shown in Fig. 9.

As best shown in Figs. 9 and 10, the conveyor, as it advances over the end of the receiving table E, passes over a roller 62 journaled in the frame 61 and thence forwardly and around a driving drum 63 which is mounted on a shaft 64 journaled in the frame 61. At the point where the belt leaves the drum 63, it passes over and rearwardly around a roller 65 which is journaled at its ends in side blocks 66, mounted in ways 67. The drum 63 and the roller 65 are provided with resilient anti-slipping coverings 68 and 69 respectively, composed of rubber or the like, so as to present a tractive surface to the belt and insure a positive driving contact therewith. The roller 65 is maintained in gripping contact with the belt F by jack screws 70 which are threaded in the ways 67 and which bear against the side blocks 66.

The drum 63 and the roller 65 are rotated by a sprocket wheel 71, which is driven in any preferred manner. The sprocket wheel 71 is mounted on a shaft 72 which carries a worm 73 meshing with a worm wheel 74 carried by a shaft 75. A pinion 76 is also keyed to the shaft 75, and meshes with a gear wheel 77 mounted on a shaft 78. A pinion 79 is also keyed to the shaft 78 and meshes with a gear wheel 80 carried by the drum 63. The gear wheel 80 meshes with a gear wheel 81 on the roller 65 whereby both the drum and roller are driven at the same peripheral speed.

The conveyor belt F, after passing around the roller 65 passes forwardly and around an idler roller 83 and thence upwardly and over a roller 84 carried by the frame 61. The idler roller 83 is carried by arms 85 which are pivotally connected to a shaft 86 carried by the frame 61 and may be adjusted to take up any slack in the belt F by means of adjustable rods 87, which are secured at their rear ends to the arms 85, and at their forward ends to the frame 1 of the delivery section B of the lehr. After leaving the roller 84, the belt F passes forwardly beneath the lehr and is supported at intervals by rollers 88 which are mounted on the frames 1 of the several sections of the lehr. At the forward or receiving end of the lehr, the lower strand of the belt F is supported, as shown in Fig. 6, by a guideway or track 89 disposed beneath the fire box D. As the belt leaves this track, it passes around a roller 90 and upwardly parallel to the front end of the fire box and thence over a roller 93 disposed adjacent to the entrance of the tunnel. From the roller 93 the belt passes over the angle plate 43 and into the front end of the lehr tunnel.

In order to facilitate the transmission of heat from the angle plate 43 to the conveyor, this element is preferably provided with a ribbed upper surface 94 (Fig. 5), thus giving a greater heat-radiating area than would be the case if the baffle 43 presented a flat surface to the conveyor belt. The ribbed surface also reenforces the baffle and tends to prevent any warping of this element through expansion and constraction.

The upper portion of the entrance of the tunnel is closed by a block or slab 95 of insulating material, the lower edge of which terminates at a sufficient distance from the conveyor to permit the passage of ware therebeneath. An insulating block 96 carried by a forwardly and rearwardly adjustable Z-plate 96ª is mounted on the bottom of the lehr at a slight distance from the tunnel opening and may carry a plurality of spaced vertical wire mesh partitions 97. These partitions separate the width of the lehr tunnel into equal spaces, each of sufficient width to accommodate a bottle, thus insuring that the ware is equally spaced transversely of the tunnel when placed on the conveyor belt by the carrying-in boy in installations not equipped with a mechanical lehr-stacking device.

The blocks 95 and 96 together practically close the entrance end of the tunnel in a horizontal direction and tend to retard the flow of air through the tunnel. By reason of the offset disposition of these blocks relative to each other, ware may be inserted between them in a vertical direction in depositing it on the conveyor. A block 43ª of heat insulating material is disposed adjacent to the member 43 and prevents air from entering the tunnel beneath the block 96. Sufficient space is, however, provided between the blocks 43ª and 96 to permit the conveyor to pass therebetween.

The ware is prevented from contacting with the inner side walls 6 of the tunnel by means of longitudinal ribs 98, which are secured to the side walls of the tunnel adjacent to the surface of the conveyor belt.

Pyrometer elements may be inserted into the tunnel at any desired points for indicating the temperatures within the tunnel. For this purpose, pipe sections 99 are shown on Figs. 6 and 7 extending through the top of the lehr and held in place by nuts 100. Similar inlet pipes for inserting pyrometer elements may be provided in the side walls as shown at 101, Fig. 7, for the purpose of determining the temperature in the heating flues.

In operation, the ware is deposited on the conveyor F and is carried by the conveyor into the tunnel. During the first part of its travel through the tunnel, the ware is subjected to a temperature necessary to bring it to a uniform temperature for a sufficient time to permit of the release of strains. After the strains have been relieved the ware is carried by the conveyor into an environment of a gradually decreasing temperature through which it passes until it emerges from the tunnel at the delivery end thereof in an annealed condition. Although the glass is set by this time, it may be, in some cases, still too hot to be handled, and it is therefore carried for a short distance along the table E where it is subjected to the cooling effect of the outside atmosphere and rapidly loses its heat. The openwork structure of the conveyor and the table E, permits heat to dissipate from the ware, in all directions, by radiation and convection. As soon as the ware reaches a temperature where it can be comfortably handled, it is removed from the conveyor, inspected and packed by operators stationed on each side of the table E. After passing over the end of the table E, the conveyor passes through the driving mechanism G heretofore described and thence forwardly beneath the tunnel to its entrance end.

By properly adjusting the various dampers in the upper and lower flues, the temperature of the tunnel may be regulated to suit the particular requirements of the type of ware being annealed.

For example, if the initial heat content of the ware at the time that it is delivered to the lehr is insufficient, after having become uniformly distributed throughout the ware, to permit the strains existing in the glass to be effectively relieved, additional heat must be supplied to the ware from an external source. In such cases the temperature in the flues 20 is maintained sufficiently high, through a portion of their length, to maintain the environment of the tunnel for a corresponding distance at a temperature at which strains in the glass may relax within a reasonable time. The flues 20 throughout this particular portion of their length function as heating flues.

After the ware reaches this temperature, the cooling operation may be begun, and the rate at which the ware is cooled from this point on is determined by proper adjustment of the various dampers. It may occur that, owing to the particular character of the ware, the cooling operation may be accelerated and in such instances the flues 20 may be utilized throughout the remainder of their length as cooling flues by adjusting the dampers 49 so as to lower the temperature in these flues below that of the ware.

In other cases sufficient initial heat is retained in certain portions of the ware, so that after it has become uniformly distributed throughout the ware, the temperature thereof is sufficiently high to permit the strains to be relieved. Under such conditions, it is unnecessary to supply additional heat to the ware and the temperature in the flues 20 may consequently be maintained lower than that of the ware, and these flues may thus function as cooling flues throughout their entire length. In such instances, the temperature in the flues 20, while being lower than that of the ware, is maintained sufficiently high to restrict the dissipation of heat therefrom to the proper rate.

The dampers 49 in the flues 20 permit a very flexible control of the temperature in these flues, as the bottom of the tunnel, being of metallic construction, follows very closely the temperature in these flues. It, therefore, follows that by properly manipulating the dampers 49 in the flues 20, the exchange of heat between the ware and the metallic bottom of the tunnel may be also very accurately controlled.

By means of the above-described features, such as the tunnel wall construction, which provide for proper insulation, radiation and reflection of heat; the corrugated top or wall, adapted to uniform transverse thermal effects; and the flues above and below the tunnel separated therefrom by their metal walls, which control the rate of movement of convection currents; the temperature of the ware throughout any transverse section or zone of the tunnel is made so nearly uniform as to approximate the ideal environment. The temperature in any transverse zone of the tunnel is substantially the same, so far as its effect upon the ware is concerned, in the top, bottom, sides and corners of that zone.

Thus, as the articles pass through the successive zones of the tunnel, they retain or acquire the progressively falling temperatures of those zones, and all portions of every article passing through any zone acquire approximately the temperature of that zone with sufficient uniformity for practical annealing. By this apparatus and method of temperature control, average glass articles may be annealed in a very short time, requiring in many cases less than one hour for the annealing and final cooling, as against the usual time of two and one-half to five hours required by the best previous commercial annealing lehrs.

The various features of the invention herein described as incorporated in a single organized apparatus may be used separately or in other combinations, and various modifications may be made in the arrangement and construction of the parts, and in the method of cooling the article to be annealed. For some uses, as for example for the handling of only one kind of ware, some of the adjustments and other provisions for handling varied kinds of ware may be dispensed with. The lehr tunnel may be made integral throughout its length. In this and in other ways the method and apparatus herein described and shown may be modified within the scope of the appended claims.

I claim:

1. The method of annealing glassware, which comprises passing a series of glass articles through a tunnel, heating a wall of said tunnel by passing a current of heated gases adjacent thereto, and regulating the heating of said wall by cooling said gases at predetermined intervals in the path of travel thereof.

2. The method of annealing glassware, which comprises passing a series of glass articles through a tunnel, heating the bottom of said tunnel by passing a current of heated gases therebeneath, and regulating the heating of said bottom by cooling said gases at predetermined intervals longitudinally of said tunnel.

3. The method of annealing glassware, which comprises passing a series of glass articles through a tunnel, heating a wall of said tunnel by passing a current of heated gases adjacent thereto, and regulating the heating of said wall by diluting said gases with cold air from the outer atmosphere at predetermined intervals in the path of said gases.

4. The method of annealing glassware, which comprises passing the ware through a tunnel, heating the lower portion of the tunnel to cause upwardly moving convection currents, cooling the upper portion of the tunnel to cause downwardly moving convection currents, and independently regulating both the heating and the cooling of said portions of the tunnel at intervals longitudinally thereof to control the rate of movement of said convection currents.

5. The method of annealing glassware, which comprises passing the ware through a tunnel, heating the lower portion of said tunnel to cause upwardly moving convection currents, cooling the upper portion of the tunnel to cause downwardly moving convection currents, and independently regulating both the heating and the cooling of said portions of the tunnel at intervals in the path of travel of the ware to selectively retard and accelerate the movement of said convection currents to obtain a substantially uniform temperature in said portions of the tunnel and to vary at will the temperature gradient in said tunnel.

6. The method of annealing glassware, which comprises passing ware through a tunnel, directing a current of heated gases adjacent to the tunnel, and diluting said current at intervals with atmospheric air to lower the temperature of said tunnel below that of the ware and to control at will the temperature gradient in said tunnel.

7. A lehr for annealing glassware comprising a tunnel, a flue associated with said tunnel, means for causing a heating medium to flow through said flue, and means for reducing the temperature in said flue selectively at any one of a plurality of intervals along said flue, and for thereby changing at will the temperature within said tunnel.

8. A lehr for annealing glassware comprising a tunnel, a flue associated with said tunnel, means for causing a heating medium to flow through said flue, the said flue being divided into a plurality of independently controllable heating zones, and means for increasing or decreasing at will the temperature in any of the said zones.

9. A lehr for glassware comprising an annealing tunnel, a heated flue disposed beneath said tunnel, a cool flue disposed above said tunnel, and means for independently regulating the temperature gradient in each of said flues longitudinally of the tunnel to vary the temperature gradient in said tunnel.

10. A lehr for glassware comprising an annealing tunnel, a heating flue and a cooling flue associated with said tunnel, damper controlled openings in said flue communicating with the outside atmosphere for independently regulating the temperature gradient in each of said flues to vary the temperature gradient in said tunnel.

11. A lehr for glassware comprising a tunnel, a flue extending longitudinally beneath said tunnel, means for causing hot gases to flow through said flue, and means for introducing atmospheric air into said flue at intervals to vary at will the temperature gradient in said tunnel.

12. A lehr for glassware comprising a tunnel, a flue extending longitudinally beneath said tunnel, means for causing heated gases to flow through said flue, and means for diluting said gases with air from the outside atmosphere at intervals in the path of travel of said gases to regulate the temperature drop in said flue and tunnel.

13. A lehr for glassware comprising a tunnel, a flue extending longitudinally beneath said tunnel, means for causing heated gases to flow through said flue, and a plurality of damper-controlled openings arranged at intervals longitudinally of said flue, and capable of being selectively opened to admit air into said flue to vary at will the temperature gradient in said flue and tunnel.

14. A lehr for glassware comprising a tunnel, a flue extending longitudinally beneath said tunnel, means for causing heated gases to flow through said flue to heat the lower portion of said tunnel, a flue extending longitudinally above said tunnel, means for causing cooling air to flow through said last-mentioned flue to cool the upper portion of said tunnel, and a plurality of damper-controlled openings arranged at intervals longitudinally of both of said flues and communicating with the outside atmosphere to vary at will the temperature gradient in said tunnel.

15. A lehr comprising a tunnel, said tunnel being inclined downwardly from its receiving end to its delivery end to cause a tendency for the heated air therein to accumulate adjacent to the entrance thereof, a flue extending longitudinally beneath said tunnel, means for causing a flow of heated gas through said flue, and means for admitting regulable quantities of air from the outer atmosphere into said flue at intervals longitudinally thereof to dilute the gases in said flue and vary at will the temperature gradient in said tunnel.

16. A lehr comprising an annealing tunnel, a heating flue extending longitudinally beneath said tunnel, a fire box located beneath the receiving end of said tunnel, a combustion chamber in said fire box, means for causing products of combustion produced in said combustion chamber to flow toward the receiving end of said tunnel and then in the opposite direction through said flue, and a plurality of baffle elements in the path of travel of said products of combustion to cause a tortuous flow of said products in passing from said chamber to said flue.

17. A lehr comprising an annealing tunnel, a heating flue extending longitudinally beneath said tunnel, a fire box located beneath the receiving end of said tunnel, a combustion chamber in said fire box, firing means associated with the fire box, means for causing products of combustion produced in said fire box to flow toward the receiving end of said tunnel and then in the opposite direction through said flue, and means located between the firing means and the flue for introducing atmospheric air into said fire box to dilute the said products of combustion and regulate the temperature thereof.

18. A lehr comprising an annealing tunnel, a heating flue extending longitudinally beneath said tunnel, a fire box located beneath the receiving end of said tunnel, a combustion chamber in said fire box, means for causing the products of combustion produced in said combustion chamber to flow toward the receiving end of said tunnel and then in the opposite direction through said flue, and means for regulating the draft in said combustion chamber to uniformly distribute the heat therein transversely thereof.

19. A lehr comprising an annealing tunnel, a heating flue extending longitudinally beneath said tunnel, a fire box located beneath the receiving end of said tunnel, a combustion chamber in said fire box, means for causing products of combustion produced in said combustion chamber to flow toward the receiving end of said tunnel and then in the opposite direction through said flue, and means for sifting the draft in said combustion chamber transversely thereof.

20. A lehr comprising a tunnel, a member for closing the upper portion of the entrance end of said tunnel, and a member for closing the lower portion of the entrance end of said tunnel, said members being disposed in different vertical planes to permit ware to be inserted between said members in depositing it in said tunnel.

21. A lehr comprising an inclined tunnel, a member for closing the upper portion of the upper end of said tunnel, and a member for closing the lower portion of the upper end of said tunnel, said members being offset relative to each other longitudinally of said tunnel and adapted to retard the flow of air through said tunnel and to permit ware to be inserted vertically between said members in depositing it in said tunnel.

22. A lehr comprising an inclined tunnel, means for retarding the flow of air through the entrance of said tunnel, said means including a baffle member closing the upper portion of the entrance and a baffle member closing the lower portion of the entrance, said baffle members being offset with respect to each other to permit ware to be inserted therebetween in depositing it in said tunnel.

23. A lehr comprising a tunnel, a member for closing the upper portion of the entrance end of said tunnel, and a member for closing the lower portion of the entrance end of said tunnel, said members being offset with respect to each other to permit ware to be inserted between said members in depositing it in said tunnel.

24. A lehr comprising a tunnel having a wall including a member provided with a plurality of corrugations, said corrugations forming a series of flues on one side of said member and a series of heat-reflecting surfaces on the other side thereof.

25. A lehr comprising a tunnel having a wall thereof formed of a plurality of sheet metal members provided with a plurality of corrugations, said corrugations forming a series of flues on one side of said members and a series of heat-reflecting surfaces on the other side thereof.

26. A lehr comprising a tunnel having a wall thereof formed of a plurality of sheet metal members, each provided with a plurality of longitudinally extending corrugations, said corrugations forming a series of flues on one side of said members and a series of heat-reflecting surfaces on the other side thereof.

27. A lehr comprising a tunnel having a wall thereof formed of a plurality of sheet metal members arranged in end-to-end relation longitudinally of the tunnel, each of said members being provided with a plurality of longitudinally extending corrugations, said corrugations forming a series of flues on one side of said member and a series of heat reflecting surfaces disposed at an angle to each other on the other side thereof.

28. A lehr comprising a tunnel, a wall of which is constructed of a plurality of sheet metal members, each having a plurality of corrugations formed therein, and a sheet metal member arranged to extend across said corrugations to bridge the same to form a plurality of flues.

29. A lehr comprising a tunnel, the top wall of which consists of a plurality of sheet metal members, each having a plurality of corrugations formed therein, a sheet metal member bridging said corrugations to form a plurality of spaced flues, and an outside layer of insulating material.

30. A lehr comprising a tunnel the top wall of which consists of a plurality of sheet metal members, each having a plurality of longitudinally extending corrugations formed therein, a sheet metal member bridging said corrugations to form a plurality of spaced flues, and an outside layer of insulating material.

31. A lehr comprising a tunnel the top wall of which consists of a plurality of inner sheet metal members, each having a plurality of corrugations formed therein, a sheet metal member bridging said corrugations to form a plurality of spaced flues, and an outside layer of insulating material supported by said bridging member.

32. A lehr comprising a tunnel the top wall of which consists of a plurality of sheet members, each having a plurality of corrugations formed therein, a sheet metal member bridging said corrugations to form a plurality of spaced flues, an outside layer of insulating material, and expansion joints provided between said members.

33. A lehr comprising a tunnel having a bottom constructed of a plurality of metallic members having a sliding connection with each other to permit of their independent expansion.

34. A lehr comprising a tunnel having a bottom consisting of a bed of refactory material and a plurality of metallic members each having one end secured to said bed to permit said members to expand in a longitudinal direction.

35. A lehr comprising a tunnel, the bottom of which consists of a plurality of inverted longitudinally extending metallic channel members arranged in end-to-end relation to provide a flue beneath said tunnel, and means for causing gas to flow through said flue.

36. A lehr comprising a tunnel, the bottom of which consists of a plurality of inverted metallic channel members arranged in end-to-end relation in pairs longitudinally of said tunnel to provide a plurality of flues beneath said tunnel, and means for interconnecting said flues to equalize the draft therein.

37. A lehr comprising a tunnel, the bottom of which consists of a plurality of inverted metallic channel members arranged in overlapping relation with each other longitudinally of said tunnel, and means for permitting independent longitudinal expansion of each of said members.

38. A lehr comprising a tunnel, the bottom of which consists of a bed of refractory material, a plurality of inverted metallic channel members mounted on said bed and arranged in end-to-end relation longitudinally of said tunnel to provide a flue beneath the same, means for securing each of said members to said bed at one end of said member, to permit said member to expand longitudinally in an opposite direction, and a yieldable joint between said members.

39. A lehr comprising a tunnel having a bottom composed of a plurality of members arranged in end-to-end relation, an edge of each of said members being provided with a flange offset relative to the top plane of said members, and adapted to underlie another edge of an adjacent member, and forming therewith a sliding connection to accommodate movement of said members in a horizontal direction caused by the expansion and contraction of said members.

40. A lehr comprising a tunnel having a bottom composed of a plurality of members arranged in end-to-end relation, an edge of each of said members being provided with a flange offset relative to the top plane of said members, and adapted to underlie another edge of an adjacent member and support a refractory packing, said flange forming a sliding connection with the edge of said adjacent member, to accommodate movement of said members in a horizontal direction caused by the expansion and contraction of said members.

41. A lehr comprising a tunnel having a bottom composed of a plurality of metallic members arranged in end-to-end relation longitudinally of the tunnel, an edge of each of said members being provided with a horizontal flange offset relative to the top plane of said member and adapted to underlie the edge of the opposite end of the adjacent member and support a refractory packing therebetween, said flange and packing forming a sliding joint with the edge of said adjacent members to accommodate longitudinal movement of said members caused by expansion and contraction.

42. A lehr comprising a tunnel having a bottom composed of a plurality of metallic members arranged in end-to-end relation, an edge of each of said members being provided with a channel adapted to contain a refractory packing, said channel being adapted to underlie an edge of the adjacent member and forming therewith a sliding joint to accommodate movement of said members in a horizontal direction caused by the expansion and contraction of said members.

43. A lehr comprising a tunnel having a bottom composed of a plurality of inverted metallic channel members arranged in end-to-end relation longitudinally of the tunnel to form a flue beneath said tunnel, the horizontal portion of each of said members being provided with a channel offset relative to the plane of said horizontal portion and adapted to contain a refractory packing and to underlie the opposite end edge of the horizontal portion of an adjacent member and forming therewith a sliding connection between said members to accommodate movement of said members in a longitudinal direction caused by expansion and contraction.

44. A lehr for annealing glassware comprising a tunnel, a flue associated with said tunnel, means for causing a heating medium to flow through said flue, the said flue being divided into a plurality of independently controllable heating zones, and means, including spaced dampers, for increasing or decreasing, at will, the temperature in any of the said zones.

45. A lehr for annealing glassware comprising a tunnel, a flue associated with said tunnel and adapted to conduct a heated medium in a substantial rectilinear path longitudinally of the tunnel, said flue having a plurality of contiguous controllable temperature controlling zones, means for causing a heated medium to flow through said flue, and means including spaced dampers for independently controlling at will the temperature drop in any of said zones.

46. A lehr for annealing glassware comprising a tunnel, a flue having a substantial portion thereof in heat transferring relation with the tunnel and adapted to conduct a heated medium therethrough to control the temperatures in the tunnel, the said portion of the flue being disposed entirely beneath the tunnel and having a plurality of independently controllable zones, and means including spaced dampers for increasing or decreasing at will the temperature drop in any of said zones, whereby the temperature gradient within the tunnel may be controlled.

47. A lehr for annealing glassware comprising a tunnel, a flue associated with the tunnel adapted to conduct a heated medium longitudinally of the tunnel to directly control the temperature of bottom portions only of said tunnel, means for causing a heated medium to flow through said flue, including a heat generating means, means for producing a draft in said flue, means, including spaced dampers, located beneath the tunnel for dividing the flue into a plurality of independently controllable zones and for increasing or decreasing at will the temperature drop throughout any of said zones, whereby the temperature of corresponding zones in the tunnel may be controlled.

48. A lehr for annealing glassware, comprising a tunnel, a flue associated with the tunnel, means for causing a heated medium to flow through said flue to directly heat the bottom only of the tunnel, and means disposed at intervals along said flue to selectively control the velocity of the gases passing through selected portions of said flue and for thereby selectively controlling the temperatures of corresponding portions in said tunnel.

49. A lehr for annealing glassware comprising a tunnel, a longitudinal flue extending beneath said tunnel, means for causing a heated medium to flow through said flue to heat directly the bottom only of the tunnel, said flue being divided into a plurality of independently controllable zones, and means for varying the temperature drop in contiguous zones from the hotter toward the cooler end of said tunnel.

50. The method of annealing glassware which comprises passing a series of glass articles through a tunnel having a bottom of high heat conductivity, applying heat to the bottom only of said tunnel by passing a current of hot gas longitudinally of and beneath the tunnel and varying the rate of heat transfer between the glass article and the bottom of the tunnel by selectively varying the heat condition of contiguous portions of said tunnel bottom by controlling the heat characteristics of the gas current passing therebeneath.

51. The method of annealing glassware, which comprises passing a series of glass articles to be annealed through a tunnel, externally heating the bottom only of said tunnel by passing a current of heated gases therebeneath, and controlling the temperature gradient in the tunnel and the ware by varying the rate of heat transfer between the glass articles and the bottom of the tunnel in selected zones by selectively varying the heat characteristics of the gases in contiguous zones longitudinally of the tunnel.

52. A lehr for annealing glassware comprising a tunnel, a conveyor of low heat mass movable through said tunnel for transporting the ware therethrough, while permitting sensitive control of the transference of heat to and from the ware, a flue associated with said tunnel and adapted to conduct a heated medium therethrough, said flue having a plurality of contiguous controllable temperature controlling zones, means for causing a heated medium to flow through said flue, and means including spaced dampers for independently controlling at will the temperature drop in any of said zones, whereby the temperature of the ware may be accurately controlled by temperature of the medium in the flue, and whereby the ware is made quickly responsive to such control.

53. A lehr for annealing glassware comprising an elongated tunnel, means for moving articles of glassware therethrough, a flue extending longitudinally beneath the tunnel from a point adjacent to the entrance end thereof to a point beyond that at which permanent strains will not be reintroduced into the glassware in the tunnel, means for passing a heated medium through said flue, and means disposed at intervals along said flue for controlling the temperatures along said flue and hence those in corresponding portions of said tunnel.

Signed at Hartford, Connecticut, this 24th day of July, 1928.

VERGIL MULHOLLAND.